United States Patent
Zhang et al.

(10) Patent No.: US 9,313,391 B1
(45) Date of Patent: Apr. 12, 2016

(54) CAMERA INTERFACES FOR ELECTRONIC DEVICES

(71) Applicant: Amazon Technologies, Inc., Reno, NV (US)

(72) Inventors: Zhibin Zhang, Cupertino, CA (US); Willy Cheung, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/460,211

(22) Filed: Aug. 14, 2014

(51) Int. Cl.
*H04N 5/225* (2006.01)
*H04N 5/92* (2006.01)

(52) U.S. Cl.
CPC ............... *H04N 5/2258* (2013.01); *H04N 5/92* (2013.01)

(58) Field of Classification Search
CPC ... H04N 5/247; H04N 5/232; H04N 5/23238; H04N 5/2258; H04N 5/92
USPC ......... 348/207.99, 211.1, 211.2, 211.3, 222.1
See application file for complete search history.

(56) References Cited

U.S. PATENT DOCUMENTS

| | | | | |
|---|---|---|---|---|
| 2010/0066865 | A1* | 3/2010 | Sakamoto | H04N 5/232 348/240.99 |
| 2011/0242356 | A1* | 10/2011 | Aleksic | H04N 5/2258 348/222.1 |

* cited by examiner

*Primary Examiner* — Yogesh Aggarwal
(74) *Attorney, Agent, or Firm* — Seyfarth Shaw LLP; Ilan N. Barzilay; Vamsi K. Kakarla (57) ABSTRACT

Approaches are described for managing the processing of image data via an electronic device. In particular, various embodiments enable a component, or combination of components, such as one or more camera interface components or other such interface components, to be integrated into a computing device (e.g., a mobile phone, a tablet computer, a wearable device, etc.) to manage the processing of image data captured by one or more cameras of the computing device. For example, one or more camera interface components, such as a camera interface circuit, can allow for coupling at least two cameras to a single input camera port of a processor component.

20 Claims, 6 Drawing Sheets

CAMERA INTERFACES FOR ELECTRONIC DEVICES

BACKGROUND

As computing devices offer increasing processing capacity and functionality, users are able to operate these devices in an expanding variety of ways. For example, computing devices are increasingly offering multiple cameras that enable additional types of functionality. In some devices, these cameras are capable of capturing high resolution images and/or videos, and can also be used to provide three-dimensional (3D) image capture for both still and video imaging. In some situations, a device can include as many as four cameras and often times more. As such, these cameras can provide a large amount of imaging data and therefore present significant opportunities for performing image analysis and other computations. However, a downside to providing a device with multiple cameras is that processing images from the cameras can require multiple components, as may include interface components, multiplexers, multiple processor components, etc. This can be expensive in terms of computation resources, power consumption, and physical space.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the foregoing or other deficiencies experienced in conventional approaches for managing the processing of sensor (e.g., camera) data via an electronic device. In particular, various embodiments enable a component, or combination of components, such as one or more sensor interface components or other such interface components, to be integrated into a computing device (e.g., a mobile phone, a tablet computer, a wearable device, etc.) to manage the processing of camera data captured by one or more cameras of the computing device.

For example, a sensor (e.g., camera) interface, such as a camera interface circuit or other interface including one or more components, can allow for coupling at least two cameras to a single camera port of a processor component (e.g., a host processor). In certain embodiments, more than one camera interface circuit can be coupled to the host processor. In this way, the host processor can be shared between one or more cameras. In the situation where the host processor is shared between two or more cameras, the host processor can be configured to selectively, or alternatively, receive image data from one of the cameras at a time, process captured image data based on the selected camera, and complete processing or provide at least a portion of the processed (or unprocessed) image data or a portion thereof to a general purpose processor for further processing.

In accordance with various embodiments, the camera interface circuit can include, for example, a number of passive components such as resistors and capacitors which advantageously allow for lower power consumption and physical space savings than using conventional components such as multiplexers and the like. In accordance with various embodiments, the cameras can be independently controlled cameras that have different frame rates and/or different resolutions. Some of these cameras may be high resolution cameras, some may be medium resolution and yet other cameras may be low resolution cameras. For example, the standard rear-facing digital camera used by a user to obtain a photograph may be a high resolution camera, while other cameras (e.g. front-facing cameras and corner cameras used for gesture detection) may be of lower resolution. The host processor can be used to correct for lens correction, depth pixel correction, format conversation, object identification, etc. Other uses can include advanced object tracking features or operations to enhance or otherwise modify the image. In certain embodiments, the output of the host processor can be provided to a general purpose processor (or device processor) for further processing.

Various other functions and advantages are described and suggested below as may be provided in accordance with the various embodiments.

In accordance with various embodiments, a user can interact with a computing device such as a smart phone, an electronic book reader, or tablet computer. It should be understood that various other types of computing devices that are capable of determining and processing input can be used in accordance with various embodiments discussed herein. These devices can include, for example, notebook computers, personal data assistants, video gaming consoles or controllers, portable media players, and wearable computers (e.g., smart watches, smart glasses, etc.) among others. In this example, the computing device can include a camera positioned on a front of the device such that the camera will likely be able to capture image information of at least a portion of the user while the user is viewing content displayed on the device. For example, the camera can be positioned on the front of the device such that an angular capture range of the camera can image at least a portion of the user while the viewer is viewing content displayed on the display element of the electronic device.

In accordance with the illustrated embodiment, the device can further include a rear-facing camera and four corner cameras. The rear-facing camera can be, for example, a high resolution digital camera used to take high definition video by the user of the mobile device. The front-facing camera can be a medium resolution camera designed to optimize video communication (e.g., video conference call, face-to-face telephone calls, etc.) between multiple devices over a network. As used throughout this disclosure, a network can be any wired or wireless network of devices that are capable of communicating with each other, including but not limited to the cellular networks, the Internet or other Wide Area Networks (WANs), Local Area Networks (LANs), Storage Area Networks (SANs), Intranets, Extranets, and the like.

In accordance with an embodiment, the four corner cameras can be low-resolution cameras designed specifically for user interface controls (e.g. detecting gestures without touching the mobile device, etc.). These cameras can be operating autonomously such that the device processor need only be woken up in the event of a particular event being detected. For example, the device processor may be awakened upon detecting that the user made a predetermined gesture that would cause the device processor to "unlock" the computing device, answer an incoming telephone call, or the like. Further, the cameras can be used to acquire images and the image data for each image can be used by the device to determine a relative position and/or orientation of the user with respect to the device. Such image information can also be used for object recognition, object tracking, or various other purposes.

The device can utilize some of the same elements as a conventional device, such as a display screen. The device can also include high and/or low-resolution cameras that can include auto-focusing elements for use in still image capture or two-dimensional video capture. The device can include other elements useful for imaging as well, such as a light sensor for determining an amount of ambient light and a white light LED, or other such illumination element, useful in illuminating objects within at least a portion of a field of view of the camera. Each imaging element may be, for example, a camera including a complimentary metal-oxide semiconductor (CMOS) device, a motion detection sensor, a charge coupled device (CCD), an infrared sensor, a quantum dot imager, a gallium arsenide sensor, or any other appropriate image capturing technology.

However, as mentioned above, in conventional hardware implementations, processing image data from the cameras can require multiple components configured to couple the cameras to the host processor. For example, the conventional image data path interface includes at least one of, for example, Low-Voltage Differential Signaling (LVDS), Mobile Industry Processor Interface (MIPI), or Mobile Display Digital Interface (MDDI), which are examples of conventional differential interfaces. A conventional host processor includes limited interface ports to support all camera inputs. For example, a conventional host processor usually includes four camera interfaces. As such, to accommodate more than four cameras, the cameras have to either first interface with a multiplexor or the cameras are daisy chained in order to work with the existing limited camera interfaces. This can be expensive in terms of computation resources, power consumption, and physical space within the device. For example, the multiplexor can require additional printed circuit board (PCB) area and power consumption. Further, using such components also increases the software complexity which is more prone to errors. In the daisy chain approach, because the cameras usually require specific software timing delay settings and software/hardware sequencing, the software complexity can increase, which as described above, can be more prone to errors.

Accordingly, in accordance with various embodiments, rather than utilizing these power-costly processes, a sensor (e.g., camera) interface circuit or other interface components can instead be integrated into a computing device (e.g., a mobile phone, a tablet computer, a wearable device, etc.) to manage the processing of sensor (e.g., image) data captured by one or more cameras or other sensors of the computing device. For example, one or more camera interface components, such as a camera interface circuit, can allow for coupling at least two cameras to a single input camera port of a host processor. In certain embodiments, more than one camera interface circuits can be coupled to the host processor. In this way, the host processor can be shared between two or more cameras. In the situation where the host processor is shared between two or more cameras, the host processor can be configured to selectively, or alternatively, receive image data from one of the cameras at a time, process captured image data based on the selected camera, and complete processing or provide the processed image data or a portion thereof to a general purpose processor (or device processor) for further.

Figure 1:
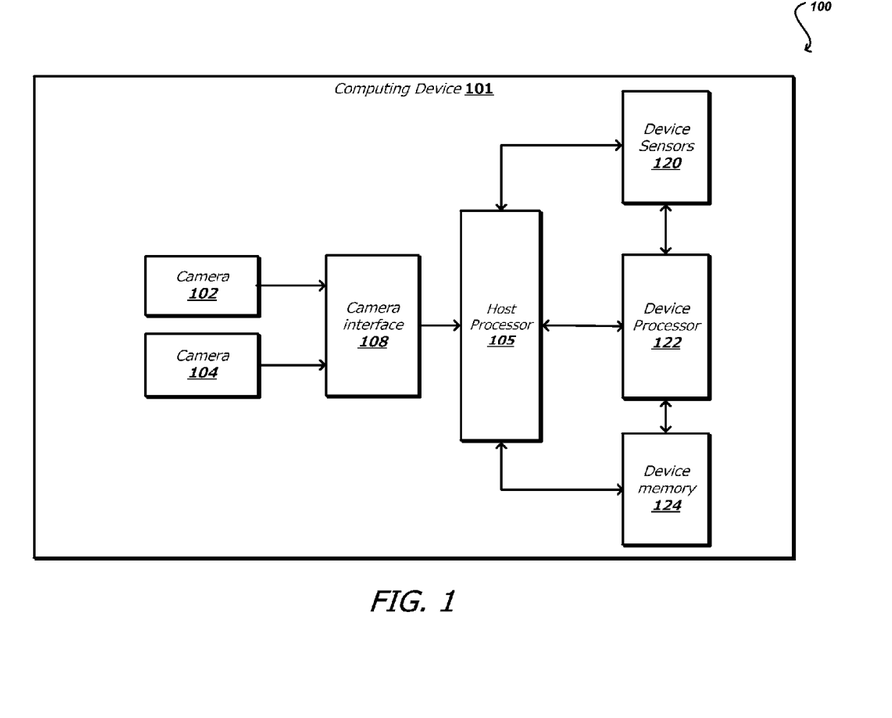
FIG. 1 illustrates an example computing device that includes a sensor interface in accordance with various embodiments.

FIG. 1 illustrates an example implementation 100 of a computing device that includes a sensor (e.g., camera) interface circuit or other interface that includes one or more components in accordance with various embodiments. As shown in FIG. 1, a computing device 101 includes, for example, cameras 102 and 104, camera interface 108, a host processor 105, device sensors 120, a device processor 122, and device memory 124. Although two cameras and one camera interface is shown, these are not to be taken as limiting and more or fewer cameras and/or camera interfaces can be used. Further, as described, the cameras can include any input device, such as low and high resolution cameras, infrared (IR) cameras, monochrome cameras, motion sensors, ultrasonic sensors, among other input capturing devices. Further still, it should be understood that various other arrangements, components, and combinations thereof can be used as well within the scope of the various embodiments, such as those shown in FIG. 2, FIG. 3, and FIG. 4, for example.

As shown in FIG. 1, first camera 102 and second camera 104 can communicate first image data and second image data to the host processor 105 via the camera interface 108. For example, first camera 102 can be coupled to camera interface 108 and the camera interface can be coupled to the host processor 105. The camera interface can, for example, allow for coupling at least two cameras (e.g., cameras 102 and 104) to a single input camera port of a host processor 105. In certain embodiments, more than one camera interface can be coupled to the host processor 105. In this way, the host processor 105 can be shared between one or more cameras. In the situation where the host processor 105 is shared between two or more cameras, the host processor 105 can be configured to selectively, or alternatively, receive image data from one of the cameras at a time, process captured image data based on the selected camera, and complete processing or provide the processed image data or a portion thereof to the device processor for further processing.

In accordance with various embodiments, the host processor 105 can, for example, be utilized for various timing control, image processing functions, image computational processing functions. The device processor can, for example, perform additional processing on image or video data captured by the imaging elements, where the additional processing and/or at least some of these actions can be beyond the capability of the host processor 105. For example, in various embodiments, the general purpose processor (or device processor) can be configured to perform at least one of gesture detection, object tracking, object recognition, stereo processing of two or more images, three dimensional (3D) image capture, image metadata tagging, time-stamping, geographical tagging, symbol reading, depth mapping, image rectification, edge detection, image scaling, object character recognition, audio recognition, or video recognition.

The host processor 105 can include, for example, an Image Signal Processors (ISPs), a Microprocessor (MP), and a Digital Signal Processor (DSPs) (not shown) to perform various image computational processing approaches, and local memory components (not shown). In accordance with various embodiments, the host processor 105 can implement image computational processing functions or other functions, and the local memory or other storage element can be used to store the functions and/or other data such as at least a frame's (e.g., image) worth of data. For example, in accordance with an embodiment, the host processor 105 can analyze the image data coming in from a respective camera, video data, and/or audio data. In the situation of image data, the data can be analyzed and the host processor 105 can send packets of information to the device processor containing high level information (e.g., machine level information). In various embodiments, at least some system-level control and image computational processing functions can be implemented by the host processor 105. Such functions enable a sensor and related components to function as a camera without accessing external control circuitry, principally sourcing of clocks to serially read out the data including options for decimation (skipping pixels, or groups of pixels during readout), binning (summing adjacent groups of pixels), windowing (limiting serial readout to a rectangular region of interest), combinations of decimation and windowing, aperture correction (correction of the lens vignetting), and lens correction (correction of the lens geometric distortion, at least the radially symmetric portion). Other examples of image computational processing functions include "blob" or region detection for segmenting fingers for hand gestures and face detection and tracking for head gestures. In certain situations, the host processor 105 is operable to run one or more image computational processes in parallel, wherein the one or more image computational processes include one of gesture detection, object detection, object recognition, or image enhancement, or any of the other image computational processes described herein. It should be noted that although the camera interface 108 is shown coupled to the host processor 105, in various embodiments the camera interface 108 can be coupled with the host processor 105 and the device processor 122 or just the device processor 122.

The cameras (e.g., camera 102 and camera 104) can be any type of camera that can be integrated into a computing device. For example, the cameras connected to a respective host processor may be high resolution, medium resolution, or low resolution cameras. Some or all of the cameras may have special modes (e.g., global shuttering, rolling shuttering). Some of the cameras may be monochrome while others may be full color. Some of the cameras may be configured as stereo pairs, while others may function independently of each other. Some cameras may have different frame rates from other cameras. In accordance with an embodiment, each camera is coupled to a respective camera interface. For example, as shown, camera 102 and camera 104 are coupled to camera interface 108. It should be noted that although the illustration shows two cameras connected to the camera interface, the number of cameras should not be perceived as a limitation to the various embodiments and that in alternative embodiments, the number of cameras and/or camera interfaces can be different.

The cameras can be coupled to a respective camera interface by way of any link that is appropriate for sending image data. For example, the higher definition cameras can be connected using a Mobile Industry Processor Interface (MIPI) bus, while the lower resolution cameras may be connected by way of serial peripheral interface (SPI) or an Inter-Integrated Circuit ($I^2C$) bus. The interface between the camera interface 108 and the host processor 105 can also be any link, such as a lower power and low speed interface such as an $I^2C$ bus.

The host processor 105 can access various device sensors 120, such as a camera controller and/or any other element, sensor, or controller. These and various other components can be controlled or otherwise managed using the host processor 105 and/or device processor 122 using an application programming interface (API) or other interface, device or system component or service. In various embodiments, various APIs can be used to control aspects of the host processor 105 as well as the various other device sensors, components, and/or controllers of the device. These device sensors, controllers and/or other components can include an ambient light sensor, motion detection sensor (e.g., a gyroscope, an accelerometer, etc.), an illumination controller that can be used to control and/or adjust an amount of illumination used to capture image or video data, or any sensor that can be controlled or accessed by the device processor 122 and/or host processor 105. Further, the APIs can be used to control a camera in communication with the host processor 105, such as to control a camera speed, window size of a detected object, image resolution, among others. In various embodiments, the device sensor 120 and other components can be controlled by the host processor 105 and/or the device processor 122. It should be noted that although device sensors 120 are shown separate from the general purpose processor (or device processor) 122 and host processor 105, in various embodiments, certain device sensors or at least a portion of their functionality can be included in the host processor 105, device processor 122, and/or distributed between the host processor 105 and device processor 122.

The camera controller can be used to enable/disable an image or video capture mode, where the camera controller can send a signal, or other such communication to the host processor 105 that one of the imaging elements is in operation. The camera controller can perform other functions, such as control the operation of a lens system such as to control photographic lens functions such as zoom, focus, etc. It should be understood, however, that other elements or controllers such as the illumination controller and the camera controller can alternatively (or additionally) be part of the host processor 105 or part of the device processor 122, and that other controllers can be used in conjunction with, or used instead of the illumination and camera controller.

Figure 2:
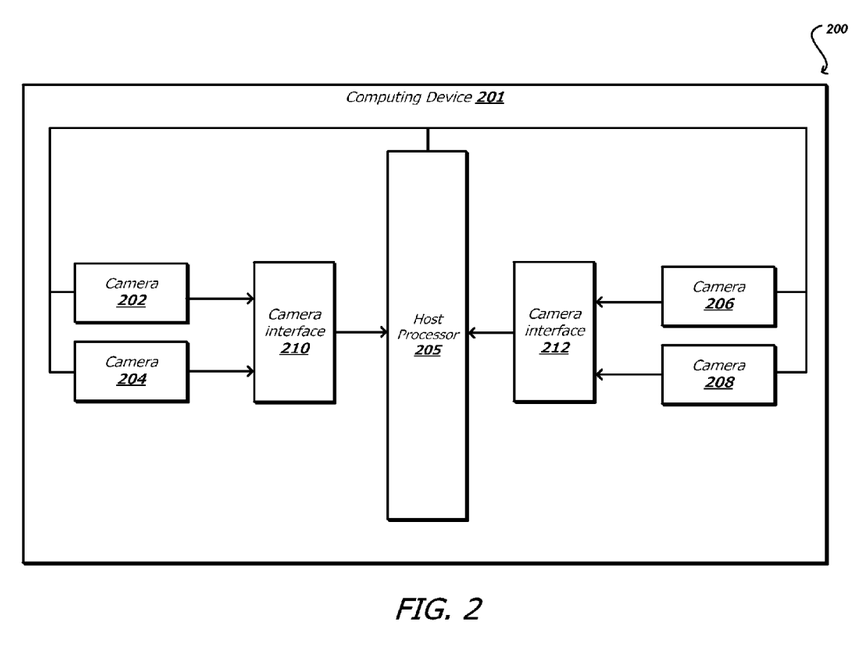
FIG. 2 illustrates an example arrangement of components of a sensor interface configured to couple one or more sensors to a processing component in accordance with various embodiments.

FIG. 2 illustrates an example arrangement 200 of cameras and camera interfaces in accordance with various embodiments. As shown in FIG. 2, a computing device 201 includes, for example, cameras 202, 204, 206, and 208, camera interfaces 210 and 212, and a host processor 205. In this example, camera interface 210 and 212 can allow for coupling cameras 202, 204, 206, and 208 to host processor 205. In this way, the host processor can be shared between one or more cameras. In the situation where the host processor is shared between two or more cameras, the host processor can be configured to selectively, or alternatively, receive image data from one of the cameras at a time, process captured image data based on the selected camera, and complete processing or provide the processed image data or a portion thereof to a general purpose processor (or device processor) for further processing.

For example, the host processor can receive image data from camera 202 and camera 206. The image data can be received concurrently or otherwise associated with each other based on time of capture/acquisition, as may include capturing such data as close to simultaneously as possible or otherwise captured such that there is a sufficiently high likelihood that the fields of view experience minimal changes during the time between the capturing of each image or based on some other trigger as may include a time-based trigger or event trigger or some other situation. It should be further noted that the cameras do not have to be a stereoscopic camera pair.

In this example, cameras 202 and 206 are active and cameras 204 and 208 are in standby or reset mode or otherwise not capturing image data. An active camera can, for example, is configured to capture image data. In this situation, the host processor 205 is configured to transmit a reset signal to cameras 204 and 208 to cause those cameras to enter the standby mode or reset mode. When a camera is in this mode, the camera is not capturing image data. Further, the output of at least some of the pins, ports, or other contact regions of the camera are put in high impedance (high-z) to electrically isolate the camera 202 from camera 204 and camera 206 from camera 208. High-z can correspond to, for example, a point in a circuit (a node) that allows a relatively small amount of current through, per unit of applied voltage at that point. The signal is neither driven to a logical high nor low level; this third condition leads to the description "tri-stated". Such a signal can be seen as an open circuit (or "floating" wire) because connecting it to a low impedance circuit will not affect that circuit; it will instead itself be pulled to the same voltage as the actively driven output. In this way, the second camera, when operating in the high impedance mode, is configured to be electrically isolated from the first camera to reduce loss of image data captured by the first camera. Thereafter, host processor can acquire the image data via the camera interface circuit from camera 202 and camera 206.

Figure 3:
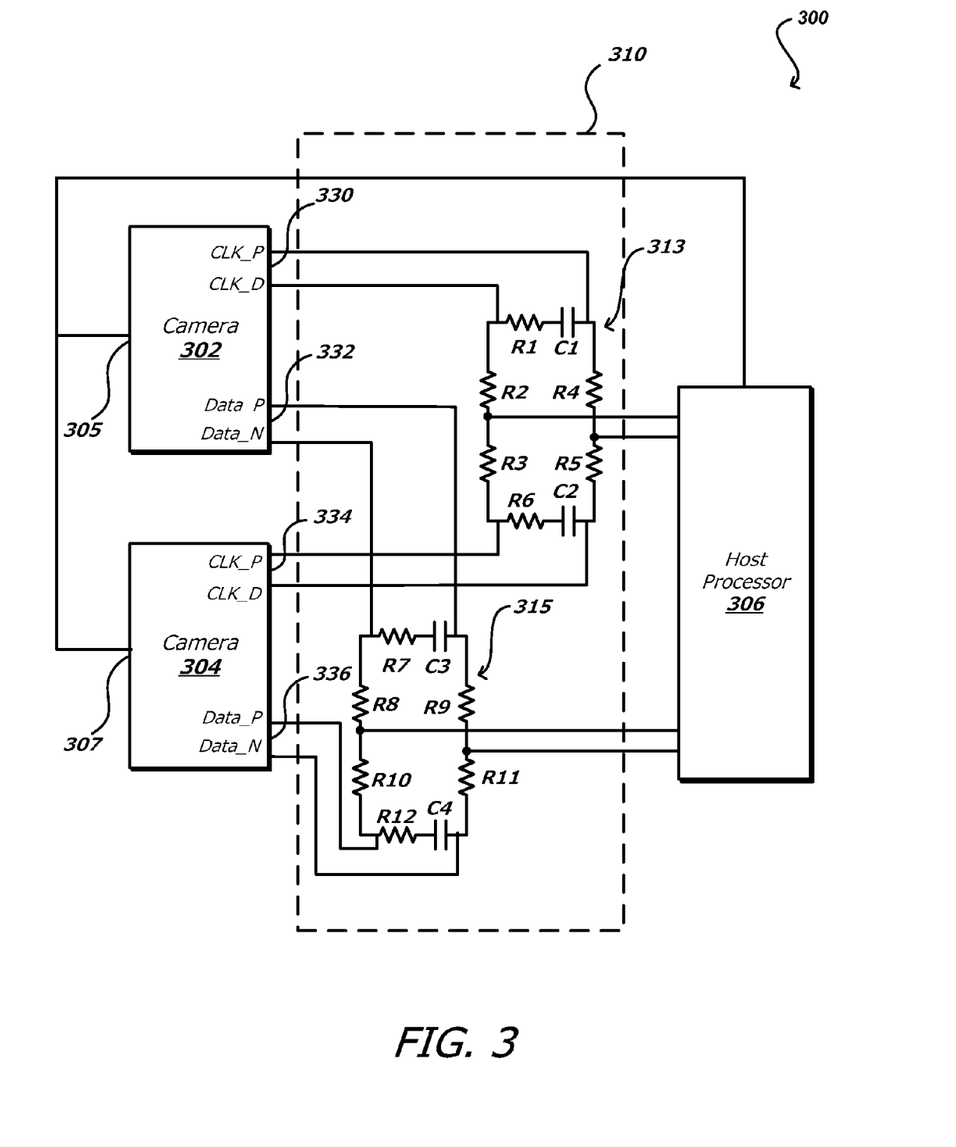
FIG. 3 illustrates example components of a sensor interface in accordance with various embodiments.

FIG. 3 illustrates example arrangement 300 of components of a camera interface in accordance with various embodiments. As shown in FIG. 3, camera 302 and 304 can provide image data to host processor 306 via camera interface 310. Camera 302 and camera 304 can include clock ports 330 and 334 respectively, and data ports 332 and 336 respectively. The clock ports (e.g., CLK_P and CLK_D) can be used to, for example, synchronize captured image data. The data ports (e.g., Data_P and Data_N) can be used to, for example, communicate image and/or video data. Camera 302 and camera 304 can include reset ports 305 and 307 respectively. The reset port, when activated, can cause a camera to enter a standby or reset mode. In this mode, at least the clock and data ports are set to a high impedance mode. When in the high impedance mode (high-z), a point in a circuit (a node) allows a relatively small amount of current through, per unit of applied voltage at that point. The signal is neither driven to a logical high nor low level; this third condition leads to the description "tri-stated". Such a signal can be seen as an open circuit (or "floating" wire) because connecting it to a low impedance circuit will not affect that circuit; it will instead itself be pulled to the same voltage as the actively driven output.

As shown, camera interface 310 includes camera interface module 313 and camera interface module 315. As described, the camera interface 310 can allow for coupling camera 302 and 304 to a single input camera port of a host processor 306. In this situation, the host processor 306 can be configured to selectively, or alternatively, receive image data from one of the cameras at a time, process captured image data based on the selected camera, and complete processing or provide the processed image data or a portion thereof to a general purpose processor (or device processor) for further.

The camera interface 310 can include, for example, a first camera interface module 313 and a second camera interface module 315. The first camera interface module 313 can include, for example, a first resistor (R1) in series with a first capacitor (C1), the second side of R1 being coupled to a first side of C1, a sixth resistor (R6) in series with a second capacitor (C2), a second side of R6 being coupled to a first side of C2; a second resistor (R2) in series with a third resistor (R3), a first side of R1 being coupled to a first side of R2, a second side of R2 being coupled to a first side of R3, the second side of R3 being coupled to the first side of R6, and a fourth resistor (R4) in series with a fifth resistor (R5), a first side of R4 being coupled to a second side of C1, a second side of R4 being coupled to a first side of R5, and the second side of R5 being coupled to a second side of C2. In this example, R2 and R4 can be high impedance resistors and can provide isolation between camera 302 and camera 304. For example, when camera 304 is providing data to the host processor, the trace between R1/C1 to camera 302 can be isolated from the signal path between camera 304 and the host processor.

The second camera interface module 315 can include, for example, a first resistor (R7) in series with a first capacitor (C3), the second side of R7 being coupled to a first side of C3, a sixth resistor (R12) in series with a second capacitor (C4), a second side of R12 being coupled to a first side of C4; a second resistor (R8) in series with a third resistor (R10), a first side of R7 being coupled to a first side of R8, a second side of R8 being coupled to a first side of R10, the second side of R10 being coupled to the first side of R12, and a fourth resistor (R9) in series with a fifth resistor (R11), a first side of R9 being coupled to a second side of C3, a second side of R9 being coupled to a first side of R11, and the second side of R11 being coupled to a second side of C4. The values the resistors and capacitors can include a range of values. For example, R1, R6, R7, and R12 can be approximately one hundred ohms, R2, R4, R3, R5, R8, R9, R10, and R11 can be approximately one mega ohm, and C1, C2, C3, and C4 can be approximately ten nanofarads. It should be noted that the arrangement of components is an example arrangement and other components (e.g., more or fewer components) and/or arrangement of components would be apparent to a person of reasonable skill in the art. For example, in accordance with various embodiments, C1, C2, C3, and C4 are optional. It should be further noted that the resistor and capacitor values are example values and other values would be apparent to a person of reasonable skill in the art.

In this example, camera 302 can be configured to capture first image data and camera 304 can be configured to capture second image data. The camera interface 310 can be coupled to the camera 302, the camera 304, and the host processor 306. The host processor can be coupled to the camera 302, the camera 304, and the camera interface 310. In various embodiments, when camera 302 is active (e.g., capturing image or video data), the host processor 306 is configured to at least transmit a reset signal to reset port 305 of camera 304. The reset signal can, for example, cause camera 304 to be placed in a standby or reset mode. When camera 304 is in standby or reset mode, at least some of the pins, ports, or other contact regions of the camera are put in high-z mode to electrically isolate camera 302 from camera 304. In this example, image data acquired by camera 302 can be read across R7 and C3 and clock data for camera 302 can be read across R1 and C1. Thereafter, the host processor can determine the image data captured by camera 302 by measuring at least the voltage across R7 and C3 and clock data of camera 302 by measuring at least the voltage across R1 and C1. For example, the host processor can include circuitry and/or software to use or otherwise interpret the voltage as image data. This can include, for example, executing various data conversion functions to convert voltage measurements to image data that can be processed by the host or other processor. For example, the image data and/or clock signal can start at a particular voltage (e.g., 1.8 v) and toggle between 0 and 1 volts. The voltage can be detected by the host processor and the host processor can use the voltage to generate or otherwise determine image data. Various other approaches as known to those skilled in the art can be applied to determine the first image data such as Mobile Industry Processor Interface (MIPI) readout data from the camera interface circuit.

In the situation where camera 304 is active (e.g., capturing image or video data), the host processor 306 can be configured to at least transmit a reset signal to reset port 307 of camera 302. The reset signal can, for example, cause the camera 302 to be placed in a standby or reset mode. As described, this can cause at least some of the pins, ports, or other contact regions of camera 302 to be placed in high-z to electrically isolate the camera 302 from camera 304. In this example, image data for camera 304 can be read across R12 and C4 and clock data for camera 304 can be read across R6 and C2. Thereafter, the host processor can determine the image data captured by camera 304 by measuring at least the voltage across R12 and C4 and clock data of camera 304 by measuring at least the voltage across R6 and C2.

In accordance with various embodiments, camera 302 and 304 can operate in a low-speed image capture mode or a high-speed image capture mode. The cameras may operate in a low-speed image capture mode, for example, based at least in part on a rate of image capture. For example, in certain embodiments, the device may only capture still image in response to the pressing of a shutter button (e.g., a physical or a virtual shutter button) wherein the rate of image capture is less than a predetermined rate (e.g., one image per second). In this situation, a user of the device may only capture a few images in succession. Alternatively, the device may operate in a high-speed image capture mode, for example, based at least in part on the rate of image capture. In this mode, for example, the images are captured in quick succession. An example rate of images captured in high-speed mode can include rates between 3 and 8 frames per second. Additionally, video capture or capturing high-resolution images can cause the device to operate in a high-speed image capture mode.

In the low-speed image capture mode, for example, the high speed clock is disabled and signal clocking information is embedded in the data. In this mode, the data rate is insufficient to drive a display, but is usable for sending configuration information and commands. In this example, the output lines for an active camera can operate like a single-ended pair. For example, the voltage of each of the clock and data lines can be measured with respect to a fixed potential, such as ground. For example, in this situation, one wire for the clock outputs or data outputs can carry a varying voltage that represents the signal, while the other wire can be connected to a reference voltage, usually ground. The clock or data signal can start at 1.8 v and toggle between 0 and 1 volts. In this mode, at least one of R1, R6, R7, or R12 can act as a termination resistor. For example, when camera 302 is active, R1 and R7 can act as a termination resistor for the clock and data ports respectively. The value of the resistors can be, for example, approximately one hundred ohms. It should be noted that other values are possible and the example values are not to be taken as limiting.

In the high-speed image capture mode, for example, the high speed clock is enabled (at frequencies from tens of megahertz to over one gigahertz) to act as the bit clock for the data lanes. Clock speeds vary by the requirements of the display. High speed mode is still designed to reduce power usage due to its low voltage signaling and parallel transfer ability. In this mode, the clock and data ports are terminated with a resistor and capacitor (e.g., R1 and C1, R6 and C2, R7 and C3, and R12 and C4). In accordance with an embodiment, when an active camera is operating at high speeds (for example, clock and/or image data is being communicated at high speeds), a corresponding capacitor acts as a short. For example, in the situation where camera 302 is active, the high speed signal can cause C1 and C3 to short. Resistors R2, R4, R3, R5, R8, R9, R10, and 11 operate as isolation resistors to isolate camera 302 and 304. A voltage corresponding of clock data for camera 302 can be measured across R1 and a voltage corresponding to image data for camera 302 can be measure across R7. In accordance with an embodiment, in this example, R2, R3, R4, R5, R8, R9, R10, and R11 can act as isolation resistors. These resistors can have a value of approximately one mega ohm but other values are possible as is known in the art. In accordance with various embodiments, an isolation resistor is a resistor used to isolate one part of a circuit from another to reduce at least a portion of image data and/or clock data leakage. In this example, this can include isolating camera 302 from camera 304. Accordingly, in accordance with various embodiments, the isolation resistors in the situation of a high speed clock and/or data signal appears electrically as an open circuit and can advantageously minimize leakage. Isolation resistors also help to maintain the electrical path so the host processor can sense the state of each line and the difference between the lines in high-speed mode.

Figure 4:
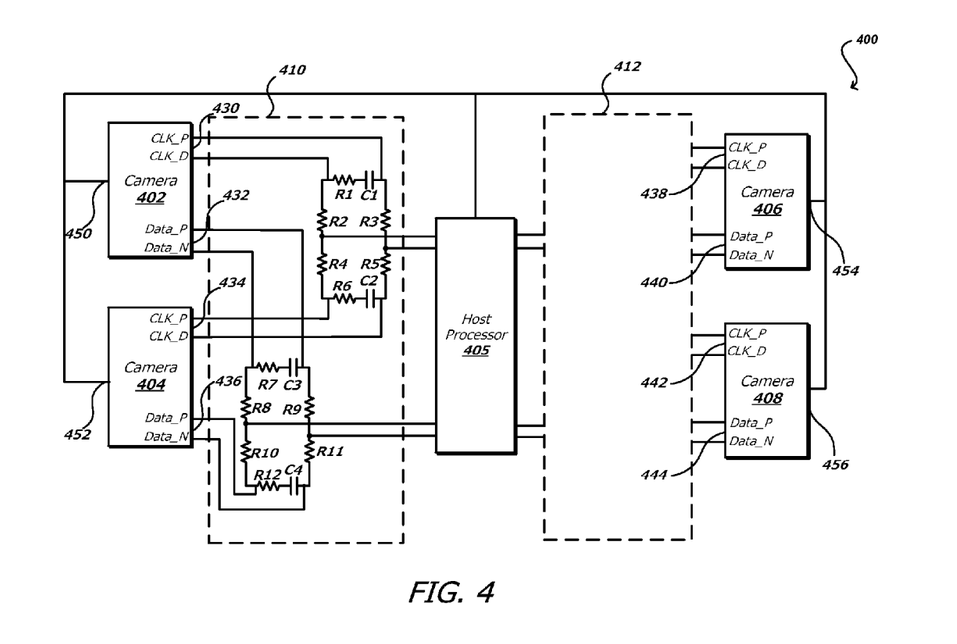
FIG. 4 illustrates an example arrangement of components of a sensor interface to couple one or more sensors to a host processor in accordance with alternate embodiments.

FIG. 4 illustrates an example arrangement 400 of cameras and camera interfaces in accordance with various embodiments. As shown in FIG. 4, a computing device can include, for example, cameras 402, 404, 406, and 408, camera interfaces 410 and 412, and a host processor 405. Cameras 402, 404, 406, and 408 can include clock ports 430, 434, 438, and 442 respectively, and data ports 432, 436, 440, and 444 respectively. The clock ports can be used to, for example, synchronize captured image data. The data ports can be used to, for example, communicate image and/or video data. Cameras 402, 404, 406, and 408 can include reset ports 450, 452, 454, and 456 respectively. As described, the reset port, when activated, can cause a camera to enter a standby or reset mode. In this mode, at least the clock and data ports are set to a high impedance mode. When in the high impedance mode (high-z), a point in a circuit (a node) allows a relatively small amount of current through, per unit of applied voltage at that point. The signal is neither driven to a logical high nor low level; this third condition leads to the description "tri-stated". Such a signal can be seen as an open circuit (or "floating" wire) because connecting it to a low impedance circuit will not affect that circuit; it will instead itself be pulled to the same voltage as the actively driven output.

In this example, the camera interfaces (410 and 412) can allow for coupling cameras 402, 404, 406, and 408 to the host processor 405. In this way, the host processor 405 can be shared between a plurality of cameras. In the situation where the host processor 405 is shared between two or more cameras, the host processor 405 can be configured to selectively, or alternatively, receive image data from one of the cameras at a time, process captured image data based on the selected camera, and complete processing or provide the processed image data or a portion thereof to a general purpose processor (or device processor) for further processing.

For example, the host processor 405 can receive image data from camera 402 and camera 406. The image data can be received concurrently or otherwise associated with each other based on time of capture/acquisition. This may include capturing such data as close to simultaneously as possible or otherwise capturing data such that there is a sufficiently high likelihood that the fields of view experience minimal changes during the time between the capturing of each image or based on some other trigger that may include a time-based trigger or event trigger or some other situation. It should be further noted that the cameras do not have to be a stereoscopic camera pair. In this example, cameras 402 and 406 are active and cameras 404 and 408 are in standby mode or reset mode or otherwise not capturing image data. In this situation, the host processor 405 is configured to transmit a reset signal to cameras 404 and 408 to cause those cameras to enter a standby mode. When a camera is in a standby mode, the camera is not capturing image data. Further, the output of at least some of the pins, ports, or other contact regions of the camera are put in high impedance (high-z) mode to electrically isolate the camera 402 from camera 404 and camera 406 from camera 408. Thereafter, host processor can acquire the image data via the camera interface from camera 402 and camera 406.

Figure 5:
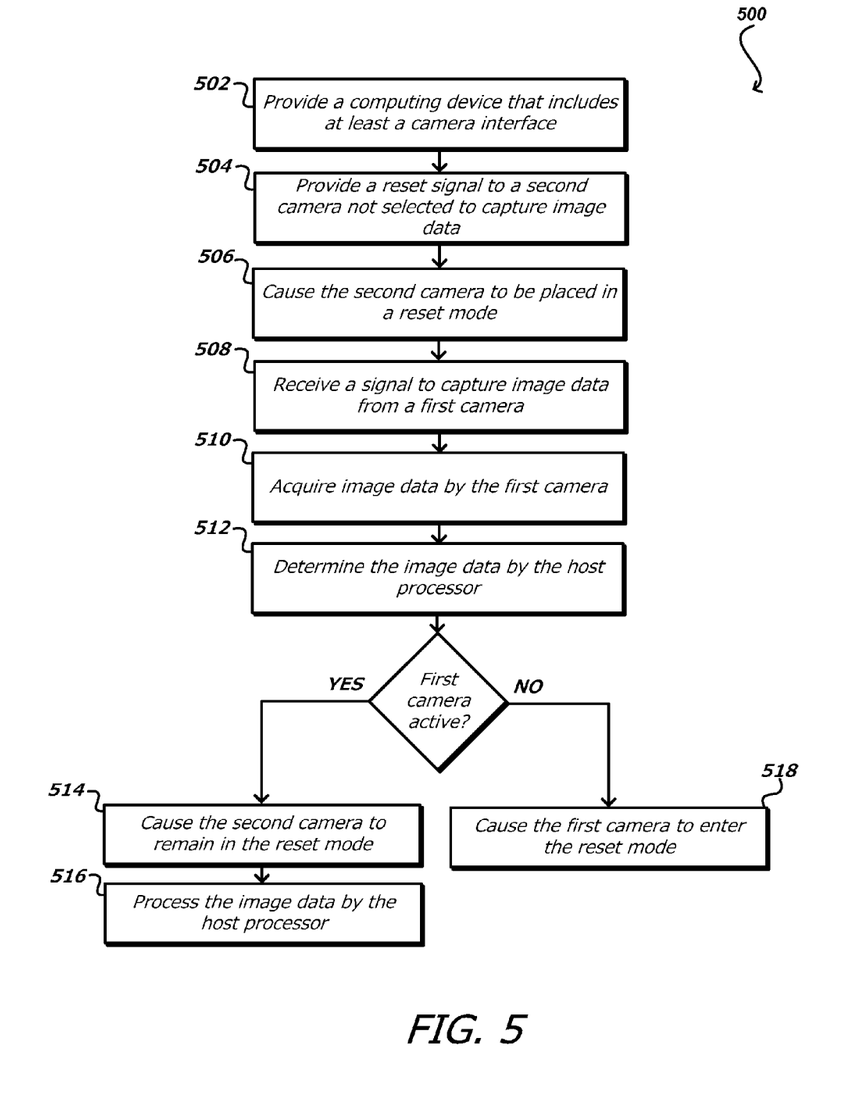
FIG. 5 illustrates an example process for managing the processing of sensor data in accordance with various embodiments.

FIG. 5 illustrates an example process 500 for managing the processing of image data in accordance with various embodiments. It should be understood that, for any process described herein, that there can be additional or fewer steps performed in similar or alternative orders, or in parallel, within the scope of the various embodiments unless otherwise stated. In this example, a computing device can be provided 502 that includes, for example, a first camera (e.g., camera 302) configured to capture first image data, a second camera (e.g., camera 304) configured to capture second image data, and a camera interface (e.g., camera interface 310) coupled to the first camera, the second camera, and a host processor (e.g., host processor 306). As described, the camera interface can allow for coupling at least two cameras to a single input camera port of a host processor. In certain embodiments, more than one camera interface can be coupled to the host processor. In this way, the host processor can be shared between one or more cameras. In the situation where the host processor is shared between two or more cameras, the host processor can be configured to selectively, or alternatively, receive image data from one of the cameras at a time, process captured image data based on the selected camera, and complete processing or provide the processed image data or a portion thereof to a general purpose processor (or device processor) for further processing.

In accordance with various embodiments, the camera interface can include at least a first interface module and a second interface module, the first and second interface modules including at least a first resistor in series with a first capacitor, a second side of the first resistor being coupled to a first side of the first capacitor; a second resistor in series with a third resistor; a fourth resistor in series with a fifth resistor; and a sixth resistor in series with a second capacitor, a second side of the sixth resistor being coupled to a first side of the second capacitor, wherein a first side of the first resistor is coupled to a first side of the second resistor, a second side of the second resistor is coupled to a first side of the third resistor, the second side of the third resistor being coupled to a first side of the sixth resistor, and wherein a first side of the fourth resistor is coupled to a second side of the first capacitor, a second side of the fourth resistor is coupled to a first side of the fifth resistor, and a second side of the fifth resistor is coupled to a second side of the second capacitor. In should be noted that components described here are example components, and one skilled in the art would appreciate using one or more additional, fewer, or other components.

In various embodiments, the host processor can be configured to provide a reset signal to a camera (e.g., a second camera) not selected to capture image or video data at operation 504. In accordance with various embodiments, the reset signal can, for example, cause at operation 506 the second camera to be placed in a standby or reset mode. When the second camera is in standby mode, at least some of the pins, ports, or other contact regions of the camera are put in high impedance to electrically isolate the first camera from the second camera.

In operation 508, the host processor can provide a signal to the first camera to cause the first camera to capture first image data. For example, a user of the device can activate one of a plurality of image or video data applications and the application can use one or more of the cameras of the device to capture image or video data. As described, the device can include, a camera positioned on a front of the device such that the camera will likely be able to capture image information of at least a portion of the user while the user is viewing content displayed on the device. The device can include a rear-facing camera and four corner cameras. By way of illustration, the rear-facing camera can be a high resolution digital camera used to take high definition video by the user of the mobile device. The front-facing camera can be a medium resolution camera designed to optimize video communication (e.g., video conference call, face-to-face telephone calls, etc.) between multiple devices over a network. The four corner cameras can be low-resolution cameras designed specifically for user interface controls (e.g. detecting gestures without touching the mobile device, etc.).

The first camera can acquire at operation 510 first image data. The host processor can determine at operation 512 the first image data via the camera interface. For example, in certain embodiments, the image data can be determined by measuring a voltage across at least a resistor and a capacitor of the camera interface. In certain embodiments, acquiring the first image data includes measuring the voltage across the first resistor in series with the first capacitor of the second interface module, wherein the first side of the first resistor of the second interface module is coupled to a first image data pin of the first camera and the second side of the first capacitor of the second interface module is coupled to a second image data pin of the first camera. The host processor can include circuitry and/or software to interpret the voltage as image data. This can include, for example, executing various data conversion functions to convert voltage measurements to image data that can be processed by the host or other processor. Various other approaches as known to those skilled in the art can be applied to determine the first image data such as Mobile Industry Processor Interface (MIPI) readout data from the camera interface circuit.

A determination can be made as to whether the first camera is active (e.g., capturing image or video data). In the situation where the camera is active, the second camera can remain at operation 514 in a standby or reset mode and the host processor can process at operation 516 the image data. In accordance with various embodiments, the host processor can be connected to some or all of these cameras by way of the camera interface that receives the image data from the cameras over buses capable of carrying image data (e.g., MIPI, SPI, I²C). The host processor can, for example, use the image data to correct for lens correction, depth pixel correction, format conversation, object identification, etc. Other uses can include advanced object tracking features or operations to enhance or otherwise modify the image. In certain embodiments, the output of the host processor can be provided to a general purpose processor (or device processor) for further processing. In some embodiments, two or more of the cameras may be configured as stereo pairs and provide the image data to the host processor for stereo processing where the host processor can, for example, enable rectification of the images and generate disparity maps for stereo processing and the like.

In the situation where the camera is no longer active (e.g., not capturing image data), the first camera can be placed or caused to be placed 518 in a standby or reset mode. The camera may not be active for a number of reasons. For example, a user of the device may have placed the device in a low power or powered off state which can cause the camera to enter a standby or reset mode. In another example, the user, an application on the device, or some other system application may have stopped use of the camera.

Figure 6:
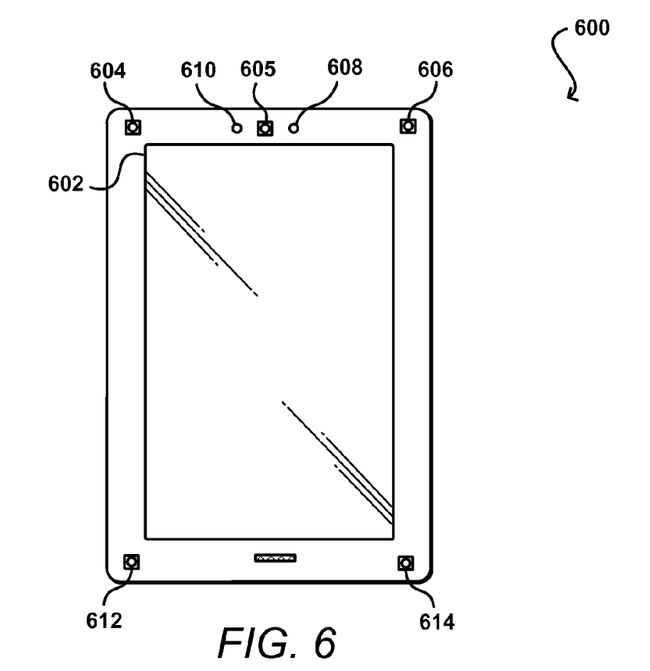
FIG. 6 illustrates a view of an example portable computing device that can be used in accordance with various embodiments.

FIG. 6 illustrates an example computing device 600 that can be used to perform methods in accordance with various embodiments discussed and suggested herein. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including an image capture element 605 on the front of the device and at least one image capture element (not shown) on the back of the device. It should be understood, however, that image capture elements could also, or alternatively, be placed on the sides or corners of the device, and that there can be any appropriate number of capture elements of similar or different types. For example, in this example, the device has four image capture elements 604, 606, 612, 614 positioned at various locations on the same side of the device as a display element 602, enabling the device to capture image information about a user of the device during typical operation where the user is at least partially in front of the display element. In this example, each capture element is a camera capable of capturing image information over a visible and/or infrared (IR) spectrum, and in at least some embodiments can select between visible and IR operational modes. Each image capture element may be, for example, a camera, a charge-coupled component (CCD), a motion detection sensor or an infrared sensor, or other image capturing technology. It should be understood, however, that there can be fewer or additional elements of similar or alternative types in other embodiments, and that there can be combinations of cameras, infrared detectors, gesture sensors, and other such elements used with various devices.

In this example, a light sensor 608 is included that can be used to determine an amount of light in a general direction of objects to be captured and at least one illumination element 610, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. The device can have a material and/or components that enable a user to provide "squeeze" input to the device by applying pressure at one or more locations. A device casing can also include touch-sensitive material that enables a user to provide input by sliding a finger or other object along a portion of the casing. Various other elements and combinations of elements can be used as well within the scope of the various embodiments as should be apparent in light of the teachings and suggestions contained herein.

Figure 7:
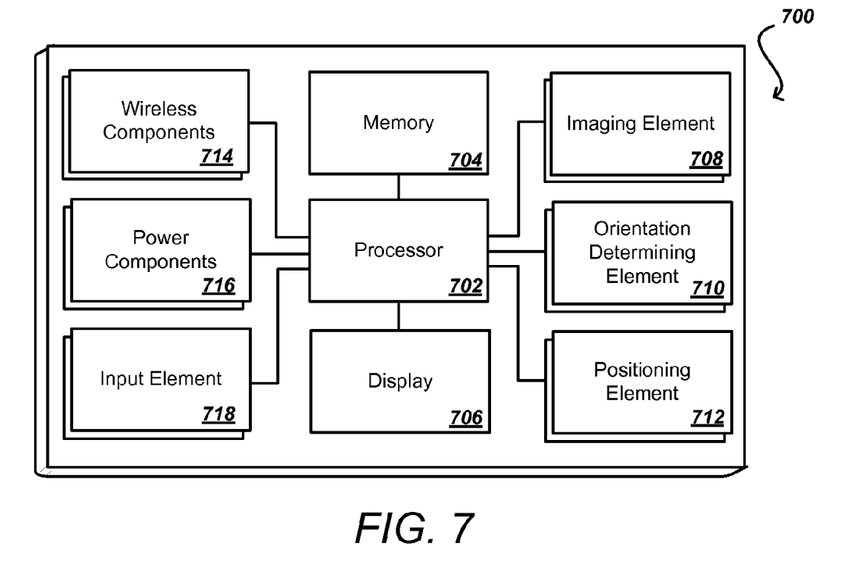
FIG. 7 illustrates an example set of basic components of a portable computing device, such as the device described with respect to FIG. 6.

FIG. 7 illustrates a set of basic components of an electronic computing device 700 such as the device 600 described with respect to FIG. 6. In this example, the device includes at least one processing unit 702 for executing instructions that can be stored in a memory component or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input component 718 able to receive conventional input from a user. This conventional input can include, for example, a push button, touch pad, touch screen, wheel, joystick, keyboard, mouse, keypad, or any other such component or element whereby a user can input a command to the device. These I/O components could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g., distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

What is claimed is:

1. A computing device, comprising:
    a first camera configured to capture first image data, the first camera including a first image data pin and a second image data pin;
    a second camera configured to capture second image data, the second camera including a third image data pin and a fourth image data pin;
    a camera interface circuit coupled to the first camera through a first camera interface module and coupled to the second camera through a second camera interface module; and
    a host processor coupled to the first camera, the second camera, the first camera interface module, and the second camera interface module, wherein the host processor is configured to:
        determine that the first camera is active,
        transmit a reset signal to the second camera to cause the second camera to enter a standby mode, wherein in the standby mode the second camera operates in a high impedance mode to electrically isolate the first camera from the second camera, and
        measure a voltage across a first resistor of the second camera interface module that is in series with a first capacitor of the second camera interface module to determine the first image data, wherein a second side of the first capacitor of the second camera interface module is coupled to the first image data pin of the first camera and a first side of the first resistor of the second camera interface module is coupled to the second image data pin of the first camera.

2. The computing device of claim 1, wherein the first camera interface module comprises a first resistor in series with a first capacitor; and wherein each of the first camera interface module and the second camera interface module further comprises:
    a second resistor that is in series with a third resistor;
    a fourth resistor that is in series with a fifth resistor; and
    a sixth resistor that is in series with a second capacitor, a second side of the sixth resistor being coupled to a first side of the second capacitor,
    wherein a second side of the first resistor is coupled to a first side of the first capacitor, and wherein the first side of the first resistor is coupled to a first side of the second resistor, a second side of the second resistor is coupled to a first side of the third resistor, the second side of the third resistor being coupled to a first side of the sixth resistor, and wherein a first side of the fourth resistor is coupled to a second side of the first capacitor, a second side of the fourth resistor is coupled to a first side of the fifth resistor, and a second side of the fifth resistor is coupled to a second side of the second capacitor.

3. The computing device of claim 2, wherein the first side of the sixth resistor of the second camera interface module is coupled to the third image data pin of the second camera and the second side of the second capacitor of the second camera interface module is coupled to the fourth image data pin of the second camera.

4. The computing device of claim 1, wherein the computing device further includes at least one of circuitry or software configured to use the voltage to generate the first image data.

5. A computing device, comprising:
    a first camera configured to capture first image data;
    a second camera configured to capture second image data;
    a processor; and
    a sensor interface coupled to the first camera, the second camera, and the processor, the processor being configured to:
        determine that the first camera is active,
        transmit a reset signal to the second camera to cause the second camera to operate in a standby mode to electrically isolate the first camera from the second camera to prevent loss of at least a portion of the first image data, and
        determine the first image data by measuring voltage across at least one component of the sensor interface.

6. The computing device of claim 5, wherein the standby mode corresponds to a high impedance mode configured to cause one or more pins of the second camera to operate tri-stated.

7. The computing device of claim 5, wherein the processor further includes:
    an image signal processor (ISP) configured to perform image correction on the first image data; and
    a digital signal processor (DSP) configured to analyze the first image data to determine machine vision information, the machine vision information associated with at least one of gesture tracking, head tracking, face tracking, object tracking, object recognition, one or more image fusion algorithms, one or more sensor fusion algorithms, or stereo processing of image data.

8. The computing device of claim 5, wherein the sensor interface includes a first interface module and a second interface module, each of the first interface module and the second interface module including:
    a first resistor that is in series with a first capacitor, a second side of the first resistor being coupled to a first side of the first capacitor;

a second resistor that is in series with a third resistor;
a fourth resistor that is in series with a fifth resistor; and
a sixth resistor that is in series with a second capacitor, a second side of the sixth resistor being coupled to a first side of the second capacitor,
wherein a first side of the first resistor is coupled to a first side of the second resistor, a second side of the second resistor is coupled to a first side of the third resistor, the second side of the third resistor being coupled to a first side of the sixth resistor, and wherein a first side of the fourth resistor is coupled to a second side of the first capacitor, a second side of the fourth resistor is coupled to a first side of the fifth resistor, and a second side of the fifth resistor is coupled to a second side of the second capacitor.

9. The computing device of claim 8, wherein a second side of a first capacitor of the second camera interface module is coupled to a first image data pin of the first camera and a first side of a first resistor of the second camera interface module is coupled to a second image data pin of the first camera; and
wherein a first side of a sixth resistor of the second camera interface module is coupled to a first image data pin of the second camera and a second side of a second capacitor of the second camera interface module is coupled to a second image data pin of the second camera.

10. The computing device of claim 8, wherein determining the first image data by measuring the voltage across the at least one component of the sensor interface includes measuring the voltage across the first resistor that is in series with the first capacitor of the second interface module.

11. The computing device of claim 5, wherein the processor is configured to couple with the first camera and the second camera via the sensor interface, and wherein the processor is further configured to:
determine source information associated with the first image data, the source information identifying that the first camera was used to capture the first image data.

12. The computing device of claim 5, wherein the processor is coupled to:
a front-facing camera, a rear-facing camera, a first corner camera and a second corner camera of the computing device via a first interface module, and
a third corner camera and a fourth corner camera of the computing device via a second interface module.

13. The computing device of claim 5, wherein the computing device further includes at least one of circuitry or software configured to use the voltage to generate the first image data.

14. The computing device of claim 5, wherein the processor is configured:
determine a rate of image capture; and
transmit a signal to the first camera to cause the first camera to operate in one of a first mode or a second mode based at least in part on the rate of image capture.

15. The computing device of claim 5, wherein the processor is further configured to:
cause the first camera to operate in a first mode;
measure the voltage across a first resistor of a second interface module of the sensor interface that is in series with a first capacitor of the second interface module; and
determine the first image data based at least in part on the voltage across the first resistor that is in series with the first capacitor.

16. The computing device of claim 5, wherein the processor is further configured to:
cause the first camera to operate in a second mode;
measure a first voltage across a first side of a first resistor of a second interface module of the sensor interface with respect to a reference voltage;
measure a second voltage across a second side of a first capacitor of the second interface module of the sensor interface with respect to the reference voltage, the first resistor in series with the first capacitor; and
determine the first image data based at least in part on a sum of the first voltage and the second voltage.

17. A method, comprising:
determining that a first camera of a computing device is active;
providing, from a host processor, a reset signal to a second camera of the computing device, the reset signal causing the second camera to operate in a standby mode to electrically isolate the first camera from the second camera to prevent loss of at least a portion of first image data captured by the first camera; and
determining, by the host processor, the first image data captured by the first camera by measuring a voltage across at least one component of a sensor interface, the sensor interface operable to be connected to the first camera, the second camera, and the host processor.

18. The method of claim 17, further including:
utilizing at least one of circuitry or software configured to generate the first image data.

19. The method of claim 17, further comprising:
measuring, by the host processor, the voltage across a first resistor of a second interface module that is in series with a first capacitor of the second interface module, the sensor interface including at least a first interface module and the second interface module.

20. The method of claim 17, further comprising:
determining source information associated with the first image data, the source information identifying that the first camera was used to capture the first image data; and
processing, by the host processor, the first image data by executing at least one image signal processing algorithm on at least a portion of the first image data.

* * * * *